H. G. CRAIG.
REBOUND CONTROLLER.
APPLICATION FILED SEPT. 29, 1919.
1,338,556.
Patented Apr. 27, 1920.
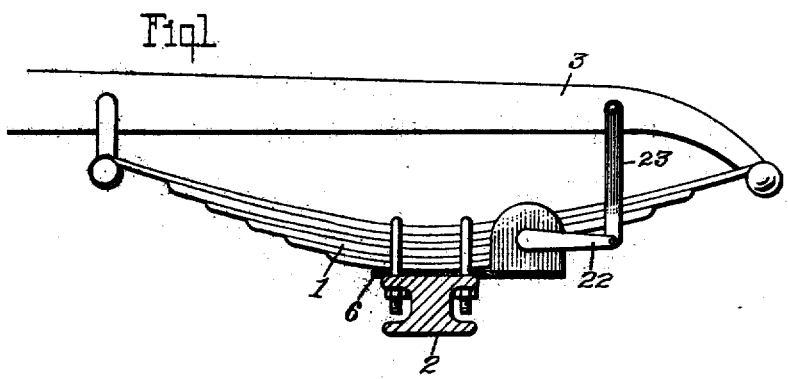
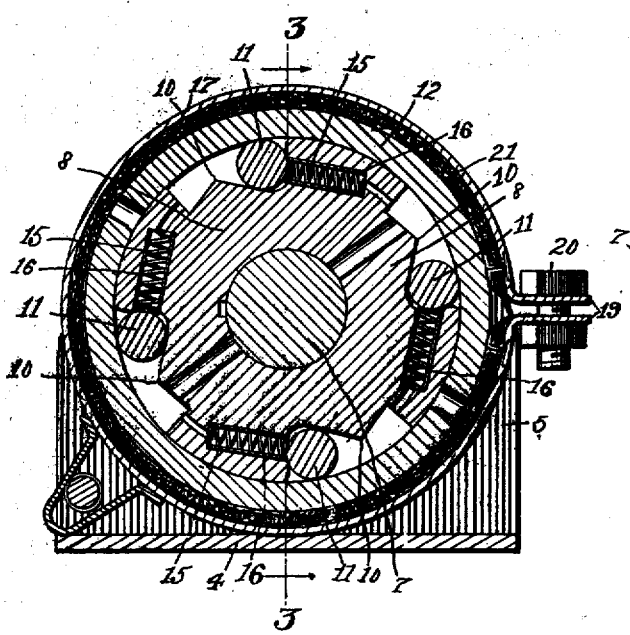
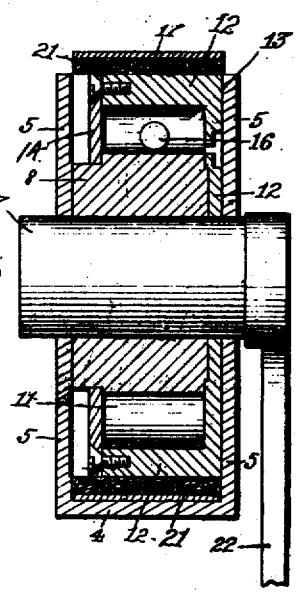
WITNESSES
INVENTOR
H. G. Craig.
BY
ATTORNEYS

UNITED STATES PATENT OFFICE.

HARRY GARREN CRAIG, OF WASHINGTON COURT HOUSE, OHIO.

REBOUND-CONTROLLER.

1,338,556.            Specification of Letters Patent.            Patented Apr. 27, 1920.

Application filed September 29, 1919. Serial No. 327,104.

*To all whom it may concern:*

Be it known that I, HARRY GARREN CRAIG, a citizen of the United States, and a resident of Washington Court House, county of Fayette, and State of Ohio, have made certain new and useful Improvements in Rebound-Controllers, of which the following is a specification.

My invention is an improvement in rebound controllers, and has for its object to provide a device of the character specified, adapted to be arranged between the frame of a vehicle and the axle, for controlling the rebound to prevent shock and jar, wherein the arrangement is such that the device offers no impediment to the compression of the spring, but cushions the expansion, and wherein the cushioning action may be varied.

In the drawings:—

Figure 1 is a side view showing the controller in use,

Fig. 2 is a vertical section through the controller,

Fig. 3 is a section on the line 3—3 of Fig. 2.

The present embodiment of the invention is shown adjacent to the spring 1 of a motor vehicle, the improvement being arranged between the axle 2 and the frame 3 of the vehicle. The improvement comprises a substantially U-shaped casing consisting of a body 4 and arms 5 extending approximately at right angles to the body, and the body has an extension 6 at one end, which is adapted to lap upon the axle 2 between the axle and the spring, and to be secured in place by the clips which connect the spring to the axle.

A shaft 7 is journaled in openings in the arms 5 of the casing, and this shaft has keyed thereto a disk 8. The peripheral surface of the disk is provided with recesses 10, four recesses being provided in the present instance, and each recess as shown consists of two portions. One of these portions of each recess has one abrupt face and one inclined face, and this portion of each recess receives rollers 11.

A housing encircles the disk, the housing consisting of a ring shaped body 12 having at one side edge a web 13 which has an opening for receiving the shaft 7. At the other edge, there is secured a ring 14, by means of screws as shown, and the web at one end and the ring at the other limit the movement of the rollers longitudinally of the shaft 7.

This housing 12—13—14 constitutes a brake ring, and it will be evident that when the upper portion of the disk 8 moves to the left of Fig. 2, the disk will move freely with respect to the brake ring, the rollers 11 moving into the deepest part of the recesses 10 and out of engagement with the internal surface of the brake ring. When, however, the shaft 7 rotates in the opposite direction, that is, with the upper portion of the disk moving to the right of Fig. 2, the rollers will move into the shallow portion of the recesses and will firmly grip the brake ring to the disk.

To insure the proper engagement of the rollers, coil springs 15 are arranged in tubular housings 16 held in recesses extending substantially circumferentially of the disk. These springs normally press the rollers toward the shallow portions of the recesses.

A brake band 17 encircles the brake disk in spaced relation, the said band being a split ring, the ends of which are bent radially outward as indicated at 19 and are connected by a bolt and nut 20. The internal surface of the ring is faced with a lining 21 of material having a high coefficient of friction. This lining engages the brake disk when the brake is set.

A radial arm 22 is secured to one end of the shaft 7, and this arm is connected by a link 23 with the frame 3 of the vehicle. The arrangement is such that when the spring is compressed, that is, when the frame moves toward the axle, the disk 8 will be rotated with its upper portion moving to the left of Fig. 2, and the rollers will not grip the brake ring to the disk.

The parts will slip idly past each other, and the device will offer no resistance to the compression of the spring. When however, the spring moves away from the axis, that is, when the springs expand, the disk will rotate in the opposite direction and will be gripped to the brake housing 12—13—14. The rotation of the housing will be resisted by the brake band, and the amount of resistance may be nicely regulated by means of the nut and bolt 20, regulating the pressure of the band on the housing.

I claim:—

A rebound snubber comprising a U-shaped frame rigid with respect to the axle of a vehicle, a shaft journaled transversely through the arms of said frame and having a radial arm connected by a link with the frame of the vehicle, a disk secured upon said shaft and having inclined slots in its periphery, a housing surrounding said disk and constituting a brake drum, spring-pressed rollers within said slots a brake band surrounding said housing and provided with means whereby its degree of contraction may be regulated, a transverse pin extending across the arms of the U-shaped frame, and a V-shaped bracket carried by said band and engaging over said pin.

HARRY GARREN CRAIG.